J. L. Ripley,
Hay Knife.
Nº 82,641.   Patented Sep. 29, 1868.
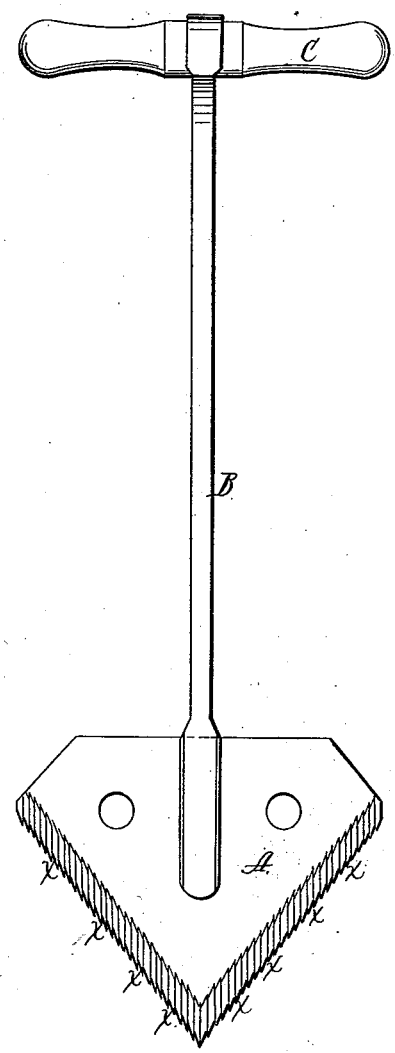
Witnesses:
Cornelius C. ao
W. D. Stockbridge
Inventor:
J. L. Ripley
per Alexander Mahen
Attys

UNITED STATES PATENT OFFICE.

JOHN L. RIPLEY, OF FREMONT, OHIO.

IMPROVEMENT IN HAY-KNIVES.

Specification forming part of Letters Patent No. 82,641, dated September 29, 1868.

*To all whom it may concern:*

Be it known that I, JOHN L. RIPLEY, of Fremont, in the county of Sandusky, and in the State of Ohio, have invented certain new and useful Improvements in Hay-Forks; and I do hereby declare that the following is a full, clear, and exact description thereof, reference being had to the accompanying drawings and the letters of reference marked thereon.

In the annexed drawings, making a part of this specification, A represents a knife or blade, made of steel, substantially in the shape shown, the cutting-edges being at an angle with its shank B and coming together to a point. The edges of the blade A are beveled or ground down to a sharp edge and then provided with a series of teeth, $x\ x$, similar to the ordinary sickle-teeth. The shank B is made of any length required and riveted to the blade A in a secure manner. The upper end of the shank B is provided with a loop, through which the handle C is inserted. The blade A, being made in the form shown, so as to give a drawing cut when inserted or forced into the hay, and being provided with the teeth $x\ x$, requires less power to insert it into and cut the hay than any knife now known or used.

I claim—

As a new article of manufacture, a hand hay-knife composed of the pointed blade A, with serrations $x\ x$ on its edge, and connected to the handle B C, all as herein shown and described.

In testimony that I claim the foregoing I have hereunto set my hand this 31st day of March, 1868.

JOHN L. RIPLEY.

Witnesses:
C. EDGERTON,
J. R. HEFFNER.